UNITED STATES PATENT OFFICE.

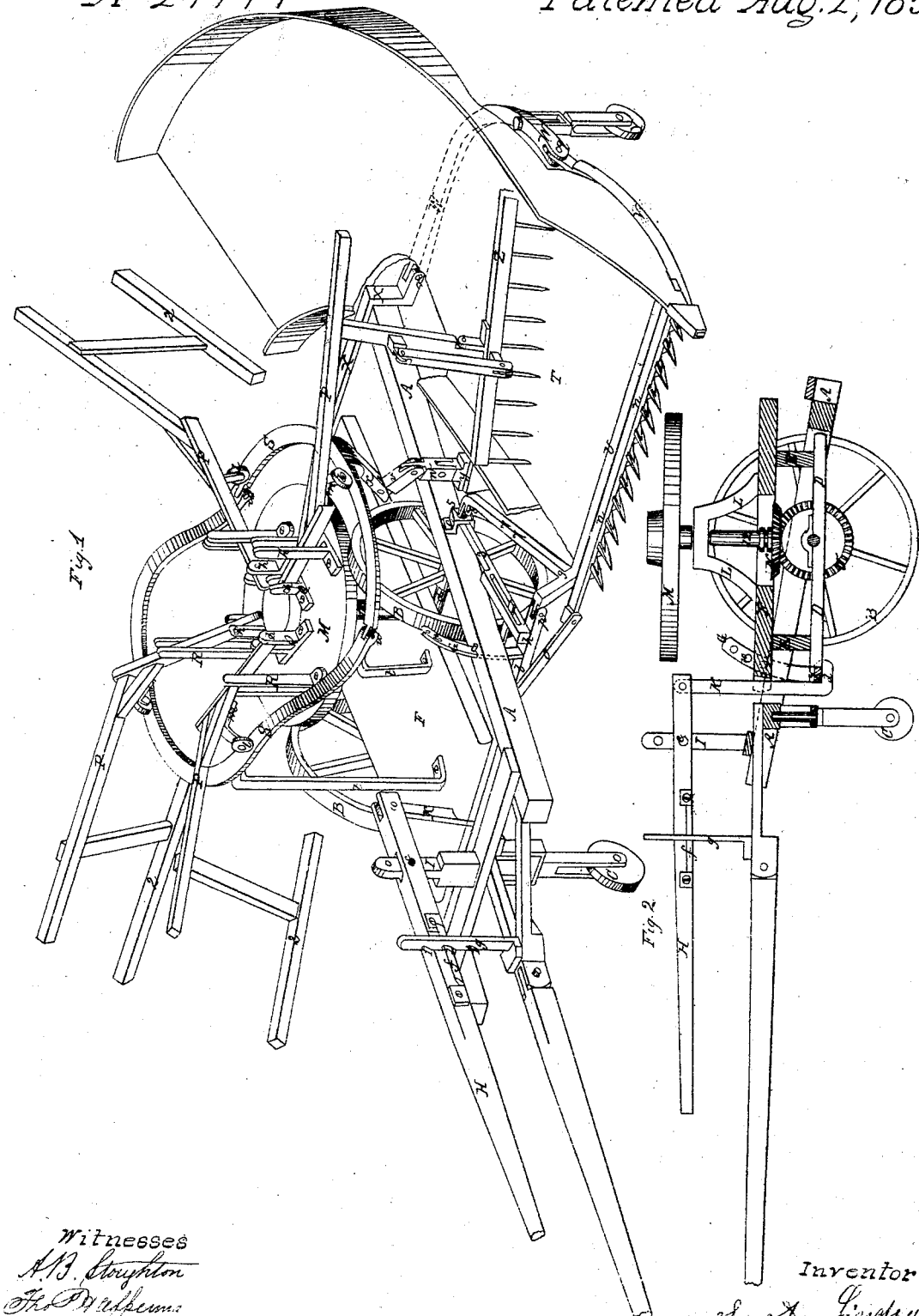

STEPHEN A. LINDSAY, OF UNIONVILLE, MARYLAND.

IMPROVEMENT IN HARVESTERS.

Specification forming part of Letters Patent No. 24,944, dated August 2, 1859.

*To all whom it may concern:*

Be it known that I, STEPHEN A. LINDSAY, of Unionville, in the county of Frederick and State of Maryland, have invented certain new and useful Improvements in Harvesting-Machines; and I do hereby declare that the following is a full, clear, and exact description of the same, reference being had to the accompanying drawings, in which—

Figure 1 represents a perspective view of said machine. Fig. 2 represents a longitudinal vertical section through the frame of the same.

The nature of my invention relates to the attachment of a self-raking apparatus to harvesters; and it consists in the manner of hinging the platform of the harvester and the circular guideway, which controls the undulating motion of the rake, to the frame of the machine, as that both the platform of the harvester and the rake shall rise and descend simultaneously when the machine passes over uneven or broken ground.

To enable others skilled in the art to make and use my invention, I will proceed to describe its construction and operation.

A represents the frame of the machine, which is supported by the two driving-wheels B on the axle $a$, and by the caster-wheel C, which is secured to a brace on the front end of the frame. This frame, being supported by the three wheels described, cannot be raised or lowered, and its weight does not bear on the beam, as in machines which are supported by the two driving-wheels only.

Within the frame A is hung another movable frame, which consists of two longitudinal bars, D, which are hung to the driving-shaft $a$, and two cross-pieces, E, to which the platform F is secured. The front ends of the bars D rest on a cross-bar, $b$, which is provided at both its ends with circular guide-pieces G, which can slide freely in suitable slots in the frame A, and which are perforated with holes 10 for the insertion of a pin to hold the frame in any desired position.

H represents a hand-lever, which is pivoted to the standard I, and has its fulcrum at $c$.

K represents a rod, which is pivoted to the end of the hand-lever H, and the lower bent end, $d$, of which supports the cross-bar $b$.

$f$ represents a stop-plate, which is secured to the side of the lever H, and the edge of which, when resting in one of the notches, 1, of the standard $g$, holds the lever H, and consequently the movable frame, in any desired position.

12 represents a vertical shaft, which is held in its position and has its bearings in the vertical supports L.

M represents a circular plate or table, which is secured to the shaft 12, and which is rotated when the bevel-wheel N is operated upon by the bevel-wheel O.

P represents four arms, to which the reels 2 and rake Z are respectively secured. Their inner ends are hinged at $k$ to the standards Q, and can freely play on their hinged points, while the arms P are guided in their vertical motions by playing within the vertical guide-pieces R.

$l$ represents friction-rollers, which turn on the bracket $m$, they being secured to the arms P. These friction-rollers support the arms in their circular motion by running on the guide-piece S, which is supported by suitable rods, $t$ The shape of the latter is represented in Fig. 1. When seen in a top view it appears in a true circular shape, which has the shaft 12 as its center. From a side view it appears as two half-circles, which are connected by inclines, and, as the rake-arms rest on said guide-piece by means of their friction-rollers, it follows that they are raised and lowered alternately according to the shape of the guide-piece S.

T represents the platform of the harvesting-machine.

$n$ is the cutter-bar, which is driven by the pitman $o$, the latter being actuated in the usual manner.

The frame of the platform is composed of the finger-bar U, which is hinged at $p$ to the bar $b$, and the frame-pieces V and W, which are hinged together at $q$, while the piece W is hinged at $r$ to the bar X of the frame A. The outer end of the platform is supported by a caster-wheel, Y, the shaft of which passes through the frame-piece W. Thus it will be seen that when the outer end of the platform is raised or lowered it will turn freely on the hinged joints $r$ and $p$; but it is essential that the rake-head should move simultaneously with the platform if the machine shall work without interruption. To accomplish this I make the circular guide-piece S of two pieces, which are hinged together at $u$ in such a manner that one of the pieces may be turned on said hinges while the other remains stationary. The movable part of the guide S is connected with the frame of the platform T by means of the links $v$ and $w$, which are respectively secured to the arm $x$ of the guide-piece S, and to the post $y$ of the platform-frame, and by this arrangement the guide-piece S is raised or lowered by a corresponding movement of the platform, and thus the rake Z and reels 2 are caused to clear the platform with the same space between them, no matter to what position the platform is brought by the roughness of the ground.

As above described, I use but one rake, Z, which is attached to one of the arms P, while the arrangement of the other arm is such as to act as reels, it being evident that in this arrangement a reel of the usual construction could not well be applied to the machine.

I will now describe the arrangement by which the front end of the platform may be raised or lowered without interfering with the proper and effectual operation of the rake and reels.

By operating the lever H, the bar $b$, which is suspended to the rod K, and consequently the frames D F and the platform M are raised and lowered, and as the finger-bar U is hinged to the cross-bar $b$, it follows that it would turn on said hinge and not participate in the movement of the frames as described. To effect this simultaneous movement I employ a bar, 3, which is secured at 4 to the bar $b$. The end of the bar 3 is secured to a small shaft, 5, within the bracket 6 on the stationary frame A, so that when the bar $b$ is raised or lowered the shaft 5 will be turned on its bearings in the bracket 6. 7 represents another bar, which is pivoted at 8 to the shaft 5, and the end 9 of which is firmly and rigidly secured to the cutter-bar U, and thus as the bar $b$ is raised or lowered the shaft 5 will be turned and the bar 7 will cause the cutter-bar U to follow the motion of the bar $b$, while the free motion of the platform T is not interfered with by reason of the pivoted joint at 8.

Having thus fully described the nature of my invention, what I claim therein as new, and desire to secure by Letters Patent, is—

1. The combination of the hinged guide-piece S with the hinged platform T, for the purpose of retaining the rake and the reels in their proper relative positions toward the platform when the latter is raised or lowered, substantially in the manner herein described.

2. The combination of the bar 3, shaft 5, and the hinged bar 7 with the movable frame of the machine and the finger-bar U, for the purpose of raising and lowering the latter without interfering with the free movements of the platform on its hinges, substantially in the manner herein described.

S. A. LINDSAY.

Witnesses:
A. B. STOUGHTON,
THOS. H. UPPERMAN.